No. 713,841. Patented Nov. 18, 1902.
W. H. BIRCHMORE.
PROCESS OF PRESERVING MILK.
(Application filed Mar. 19, 1902.)
(No Model.)
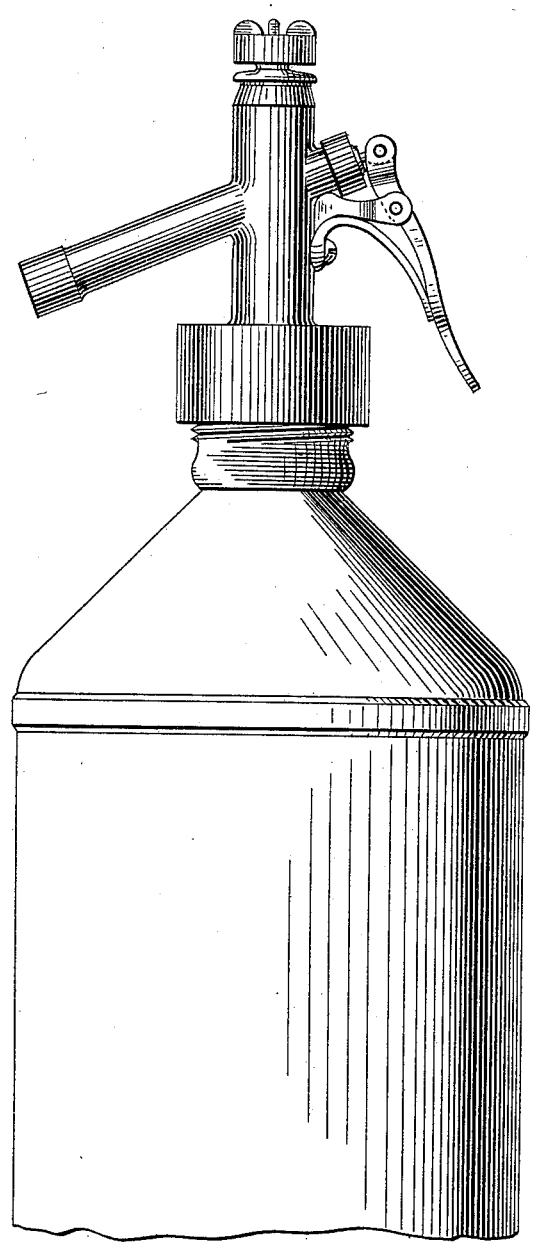
Witnesses:
C. W. Benjamin
Sands F. Randall
Inventor:
Woodbridge H. Birchmore,
by Clarkson A. Collins
atty

UNITED STATES PATENT OFFICE.

WOODBRIDGE H. BIRCHMORE, OF BROOKLYN, NEW YORK, ASSIGNOR OF ONE-HALF TO CLARKSON A. COLLINS, OF NEW YORK, N. Y.

PROCESS OF PRESERVING MILK.

SPECIFICATION forming part of Letters Patent No. 713,841, dated November 18, 1902.

Application filed March 19, 1902. Serial No. 98,942. (No specimens.)

*To all whom it may concern:*

Be it known that I, WOODBRIDGE H. BIRCHMORE, a subject of the King of Great Britain, residing in the borough of Brooklyn, city of New York, county of Kings, and State of New York, have invented certain new and useful Improvements in Processes of Preserving Milk, of which the following is a specification.

While my invention may be applied generally to any liquid which it is desired to preserve from the action of destructive bacilli, it is more especially intended to be applied to the preservation of milk, the importance of accomplishing which is well understood. Heretofore an attempt has been made to accomplish this by a process which consists of the steps, in the order named, of charging the liquid into a suitable air-tight vessel, forcing in a sterile gas under pressure sufficient to expel the liquid from the vessel, and finally subjecting the vessel and its contents to a pasteurizing temperature. This process has, however, proven commercially impracticable because of the abnormally-great amount of breakage of the glass containing vessels when subjected to the temperature essential to the pasteurization of the liquid. I have discovered that this breakage is due to the strain upon the vessel caused by the expansion of the gas, already under pressure within the vessel, when the necessary degree of heat is applied and that by subjecting the vessel to a pasteurizing-heat before the introduction of the gas the liquid is equally well preserved and the breakage of the vessels in the course of heating is avoided.

My process is designed to be practiced in connection with an air-tight distributing vessel having an outlet-valve, such as the siphon-bottle illustrated in the drawing, in which the milk is contained under gas-pressure sufficient to expel it therefrom, so that it can be drawn in successive portions as required for consumption without access of the external atmosphere to the portion remaining.

As a preliminary step I prefer to sterilize the interior of the vessel before filling it with milk, as by forcing steam into or through it, to the end of destroying any disease-germs that might be contained in it. The milk is then charged into the vessel in the desired quantity, space being left for the presence of gas under pressure sufficient to expel the milk from the bottle. The milk is then pasteurized in the well-known manner by raising it to a proper temperature under 212° Fahrenheit, as is well understood. After the milk is pasteurized a sterile or sterilized gas is forced into the vessel until pressure sufficient to serve to expel the milk from the bottle as required for use is attained. Any sterile gas, such as atmospheric air sterilized by heat, that will not be readily absorbed by and will not act deleteriously upon the milk may be employed. The milk is then ready for use and may be drawn from the bottle as required.

By means of my invention not only is the milk freed from destructive bacilli and protected from contamination by contact with the atmosphere when drawn in successive portions, but its pasteurization is effected without the prohibitive breakage of the containing vessels which has hitherto attended all attempts to practice such a process. The advantages of this will be readily apparent to those skilled in the art.

What I claim as new, and desire to secure by Letters Patent, is—

The process of preserving milk for use in successive portions which consists in sterilizing an air-tight containing vessel having an outlet-valve, charging the milk into such vessel, pasteurizing the milk in the vessel and finally forcing into the vessel a sterile gas under pressure sufficient to expel the milk therefrom.

In testimony whereof I have hereunto subscribed my name this 10th day of March, A. D. 1902.

WOODBRIDGE H. BIRCHMORE.

Witnesses:
CLARKSON A. COLLINS,
WILLIAM J. KINDGEN.